June 11, 1929.  R. W. BAKER ET AL  1,716,365

MACHINE FOR TIGHTENING SCREWS

Filed Oct. 6, 1927  2 Sheets-Sheet 1

Inventor
Russell W. Baker
and Orville Shaw
By Spencer Hardman & Fehr
their Attorneys

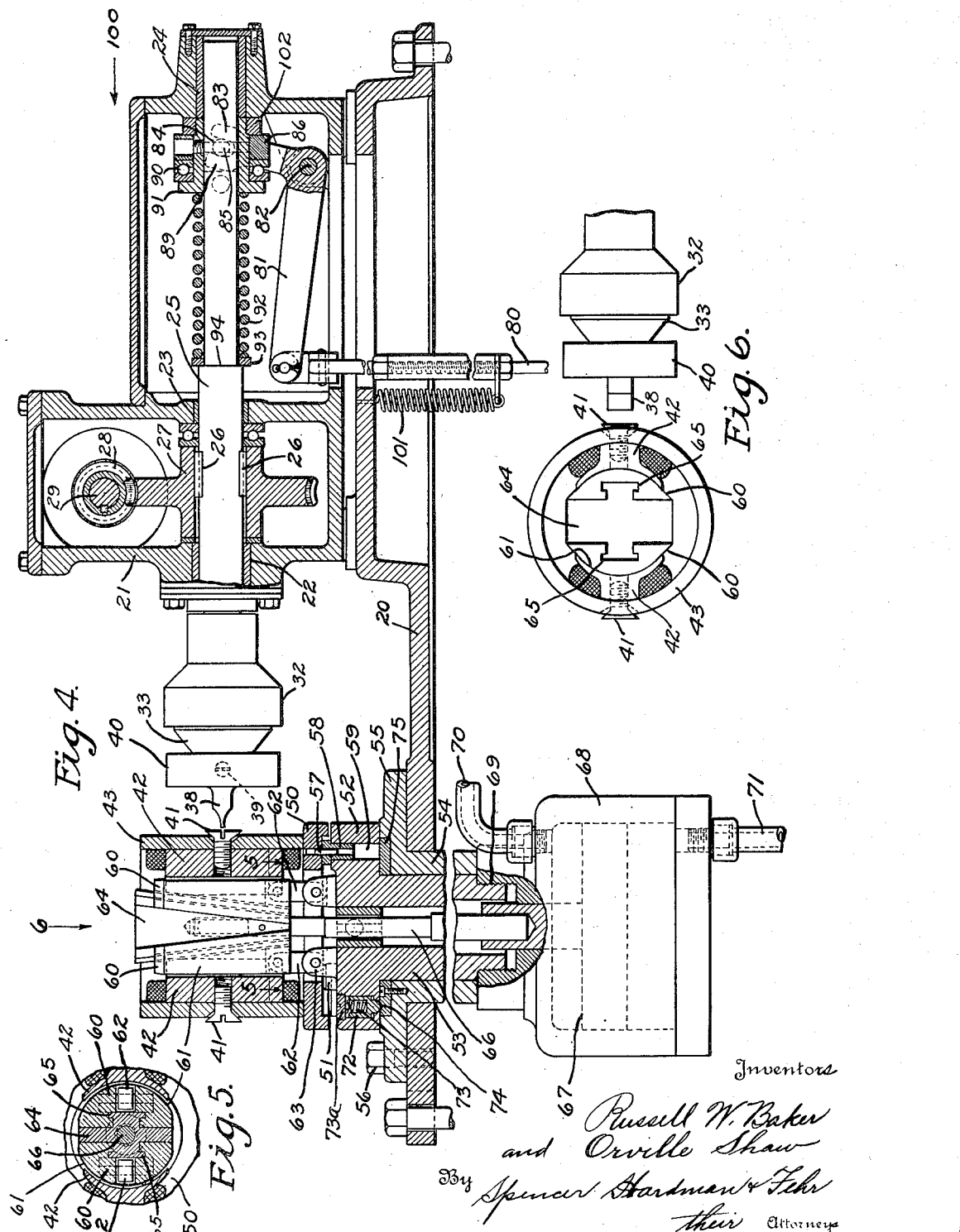

Patented June 11, 1929.

1,716,365

UNITED STATES PATENT OFFICE.

RUSSELL W. BAKER AND ORVILLE SHAW, OF ANDERSON, INDIANA, ASSIGNORS TO DELCO-REMY CORPORATION, OF DAYTON, OHIO, A CORPORATION OF DELAWARE.

MACHINE FOR TIGHTENING SCREWS.

Application filed October 6, 1927. Serial No. 224,493.

This invention relates to apparatus for holding the parts of a machine or article of manufacture in assembled relation, and to a power driven screw-driver for tightening screws for securing such parts together.

One object of the present invention is to provide a device which is particularly adapted for holding in assembled relation the field frame parts of a dynamo electric machine, and to provide a power driven screw-driver for tightening with predetermined pressure the screws which secure the pole pieces to the machine frame.

Further objects and advantages of the present invention will be apparent from the following description, reference being had to the accompanying drawings, wherein a preferred form of embodiment of the present invention is clearly shown.

In the drawings:

Fig. 4 is a sectional view on the line 4—4 of Fig. 1.

Fig. 5 is a sectional view on the line 5—5 of Fig. 4.

Fig. 6 is a fragmentary plan view looking in the direction of the arrow 6 in Fig. 4, the field frame parts being clamped together by the work holder.

Figure 3:
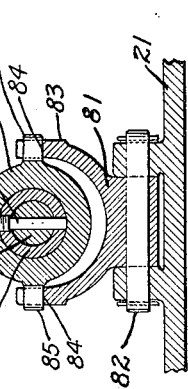
Fig. 3 is a sectional view on the line 3—3 of Fig. 1.
Figure 1:
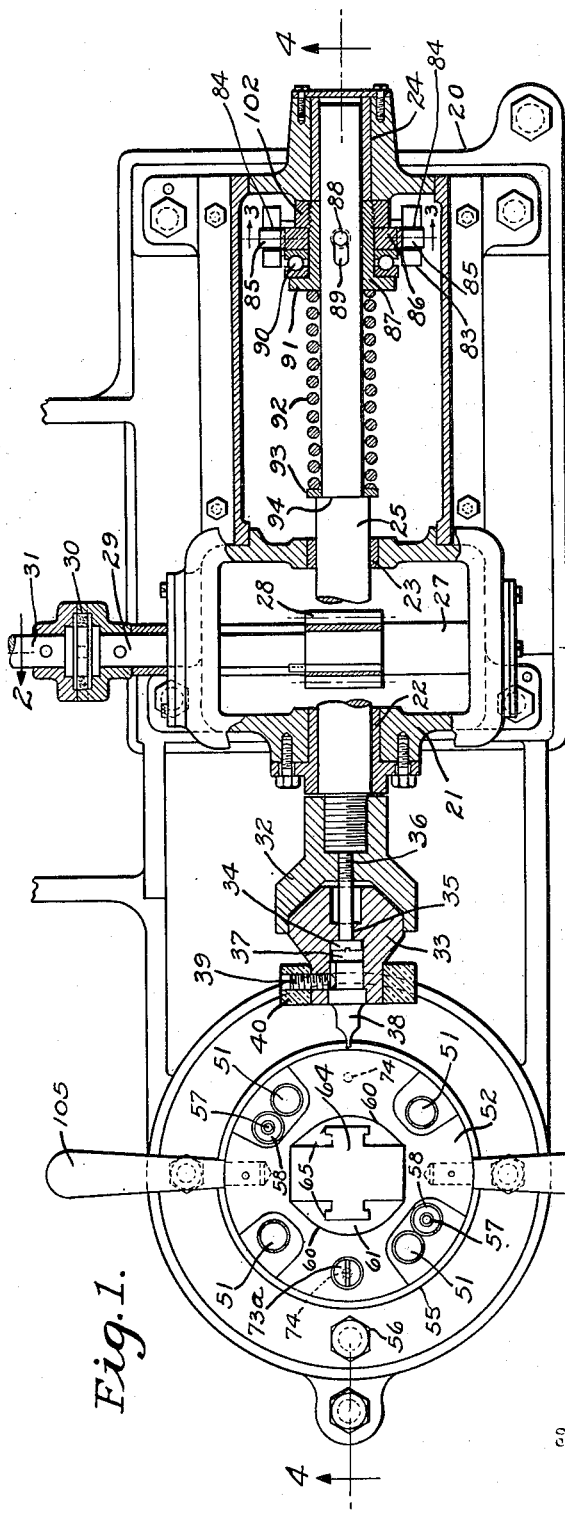
Fig. 1 is a plan view, partly in section, of a machine for holding dynamo field frames and a power driven screw-driver.
Figure 2:
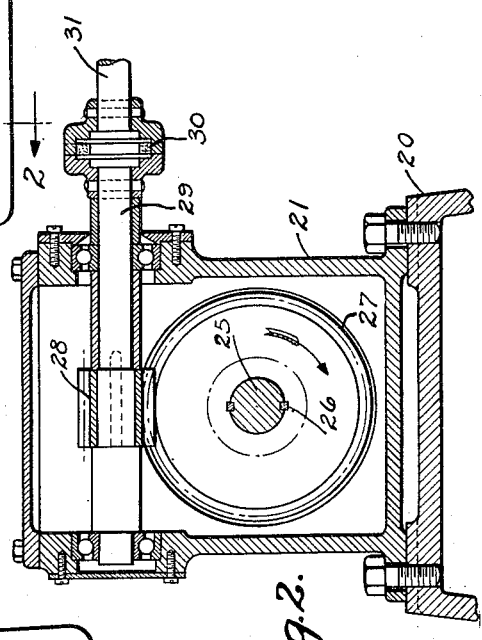
Fig. 2 is a sectional view on the line 2—2 of Fig. 1.

Referring to the drawings, 20 designates the base of the machine which supports a gear housing 21 providing bearings 22, 23 and 24 for a shaft 25 which is mounted for endwise movement. The shaft 25 is slidably splined by keys 26 to a worm gear 27 which is driven by worm 28 carried by the shaft 29 which is driven through a coupling 30 by a power gap 31 connected with an electric motor or other source of power. The shaft 25 carries the driving member 32 of a conical friction clutch which normally loosely supports a driven clutch member 33. Members 32 and 33 are normally loosely held together by a screw 34 passing loosely through a hole 35 in the part 33 and screwed at 36 into the part 32. The driven clutch member 33 is provided with a socket 37 for receiving a screw-driver bit 38 which is maintained in the socket by a set screw 39.

The clutch part 33 carries a fiber disc or collar 40 to be used by the operator in guiding the screw-driver bit 38 into the slot of the screw 41.

The screws 41 as shown in Figs. 4 and 6, are used to secure the pole pieces 42 to the field frame 43 of a dynamo electric machine. The work holder and clamp which is particularly adapted for holding the field frame while the screws 41 are being driven comprises a table 50 which rests upon a number of buttons 51 removably supported by a table 52 having a shank 53 rotatably supported by a sleeve 54 which extends through an opening in the base 20 and has a flange 55 by which the sleeve is supported by the base. A number of screws 56 secure the flange 55 to the base 20. As stated before, the buttons 51 maintain the table 50 in a definite relation vertically to the table 52. In order to adapt the machine for operating upon field frames of different lengths, requiring different spacing of the screws from the ends of the frames, another set of buttons 51 may be substituted for those shown in the drawings, the substituted buttons having their heads of such thickness as to locate the table 50 correctly with respect to the table 52 and the axis of the shaft 25. Rotation of the table 50 relative to the table 52 is prevented by pins 57 carried by the table 50 and adapted to enter apertured bushings 58 extending into holes 59 of the table 52.

The pole pieces and frame are maintained temporarily in assembled relation to the work holder by means of clamps 60 having their surfaces 61 so shaped as to fit snugly the pole pieces 42 as shown particularly in Fig. 6. The clamps 60 are pivotally connected with links 62 which are pivoted upon ears 63 extending upwardly from the table 52. The clamps 60 are spread by a wedge 64 which has extensions 65 which are T-shape in cross section and are slidable through corresponding T slots in the clamps 60. The wedge 64 is moved vertically by a piston rod 66 attached to a piston 67 movable vertically in a cylinder 68 which is threadedly engaged by the lower end of the shank 53 as shown at 69. The cylinder spaces on either side of the piston 67 are connected by flexible pipes 70 and 71 with valves, not shown, which are used to admit compressed air into either end of the cylinder as desired. It is apparent that downward movement of the piston 67 will cause the wedge 64 to spread the clamp 60 in order to force the pole pieces firmly against the field frame as shown in Fig. 6. The work is yieldingly maintained so that one of the screws 41 is in alignment and adjacent to the screw-driver bit 38 by a detent plunger 72 urged by a spring 73 as shown in Fig. 4 into a recess 74 provided by a removable detent plate 75 carried by flange 55. The spring 73 is retained by a screw plug 73ª. The plate 75 willo carry two diametrically opposite recesses 74. Obviously for a four pole frame, a detent plate 75 having four equi-distant recesses 74 will be substituted for the one shown in the drawing.

The shaft 25 is moved endwise toward the work by mechanism including a pedal operated rod 80 attached to a bell crank lever 81 pivoted at 82 upon the gear housing 21. The lever 81 is provided with a bifurcated arm or yoke 83 notched at 84 for engaging the pins 85 of a shifter ring 86 which surrounds a sleeve 87. The sleeve 87 carries a pin 88 passing diametrically through a slot 89 in the shaft 25. When the rod 80 is moved downwardly the shifter ring 86 will transmit motion through a thrust bearing 90 to the flange 91 of the sleeve 87. From the flange 91 motion is transmitted yieldingly to a spring 92 through a washer 93 bearing against the sleeve 94 of the shaft 25. Thus pressure upon the screw 41 by the screw-driver bit 38 is applied yieldingly to the spring 92.

To use the power driven screw-driver, the operator grasps the fiber collar 40 while the shaft 25 is turning and while moving the rod 80 downwardly the operator guides the bit into the screw slot. Further downward movement of the rod 80 will cause sufficient pressure to be applied through the spring 92 to cause the friction clutch members to be drivingly connected. Rotation of the shaft 25 in a clockwise direction as viewed looking in the direction of the arrow 100 in Fig. 4 will cause the screw 41 to be tightened. After the screw has been "driven home" the friction clutch will slip so as to prevent damage to the apparatus. Movement of the rod 80 is so limited and the spring is so designed that the amount of pressure applied by the screw-driver bit 38 to the screw 41 is limited to that only required to tighten the screw. After the screw adjacent the power driven screw-driver has been tightened the operator will release the rod 80 to permit a spring 101 to restore the lever 81 to the position shown in Fig. 4. As the lever arm 83 moves clockwise it will move the shifting collar 86 toward the right and against a nut 102 carried by the sleeve 87. The sleeve 87 will in turn move the pin 88 toward the right. Since the pin 88 has been forced by the spring 92 against the right hand end of the slot 89 the shaft 25 will be moved toward the right thus withdrawing the bit 38 from the screw 41.

Handles 105 are provided for rotating the tables 52 and 50 and hence the work in order that another of the screws 41 may be located adjacent to and in alignment with the screw-driver bit.

By means of the present apparatus work may be quickly clamped in position and screws may be quickly tightened with uniform effort thus securing uniformity and economy in production.

While the form of embodiment of the present invention as herein disclosed, constitutes a preferred form, it is to be understood that other forms might be adopted, all coming within the scope of the claims which follow.

What is claimed is as follows:

1. A machine for tightening screws comprising, in combination, a power driven shaft, a screw-driver movable with the shaft, a holder for retaining parts including a screw, a manually operated yoke for moving the shaft toward the parts and for pressing the screw-driver against said screw, and an overload slipping cone clutch for connecting the shaft and screw-driver when the screw-driver is pressed against the screw.

2. A machine for tightening screws for securing pole pieces to the field frames of dynamo electric machines comprising, in combination, a table for receiving a field frame, a clamping device, around which the frame is located, having members movable toward the frame in order to clamp the pole pieces to the frame, means for forcing said clamping members into engagement with the pole pieces, a power driven screw-driver engageable with screws for securing the pole pieces to the frame, and means for rotatably supporting the table and clamping means in order that the various screws may be located adjacent to the screw-driver.

3. A machine according to claim 2 in which the means for forcing the clamping members into engagement with the pole pieces comprises a wedge movable axially through the field frame and a fluid pressure cylinder located below the table and attached thereto and a piston within the cylinder connected with said wedge, the cylinder being rotatable with the table.

4. A machine for tightening screws for securing pole pieces to the field frames of dynamo electric machines comprising, in combination, a rotatably supported table for receiving a field frame, means for rotating said table, means for locking said table in position, a clamping device, around which the frame is located, having pivoted members movable toward the frame in order to clamp the pole pieces to the frame, means for forcing said clamping members into engagement with the pole pieces, a power driven screw-driver engageable with screws for securing the pole pieces to the frame, and means for rotatably supporting the table and clamping means in order that the various screws may be located adjacent to the screw-driver.

5. A machine for tightening screws for securing pole pieces to the field frames of dynamo electric machines comprising, in combination, a power driven screw-driver, a table, interchangeable buttons mounted on the table, a second table for receiving a field frame and mounted on the buttons, the distance from the second table to the screw-driver being governed by the thickness of the interchangeable buttons, clamping members, around which the frame is located, means for forcing said clamping members into engagement with the pole pieces in the frame, and means for rotatably supporting the tables and clamping means in order that the various screws may be located adjacent to the screw-driver.

6. In a device for operating upon the frame of dynamo electric machines, the combination of a tool for operating upon the frame with a support for the frame consisting of a table, interchangeable buttons mounted upon said table, a second table mounted upon the buttons said second table receiving the frame to be operated upon, clamping members movable toward the frame thereby holding the frame in position, and means for forcing said clamping members toward said frame.

7. A support for a frame of a cylindrical member, a pair of tables, interchangeable buttons on one of said tables for supporting the other table, said other table receiving and supporting the frame of the cylindrical member, a clamping device, around which the frame is located, having members movable toward the frame, a wedge movable axially of said frame to force the clamping members into engagement with the frame.

In testimony whereof we hereto affix our signatures.

RUSSELL W. BAKER.
ORVILLE SHAW.